United States Patent Office 3,562,882
Patented Feb. 16, 1971

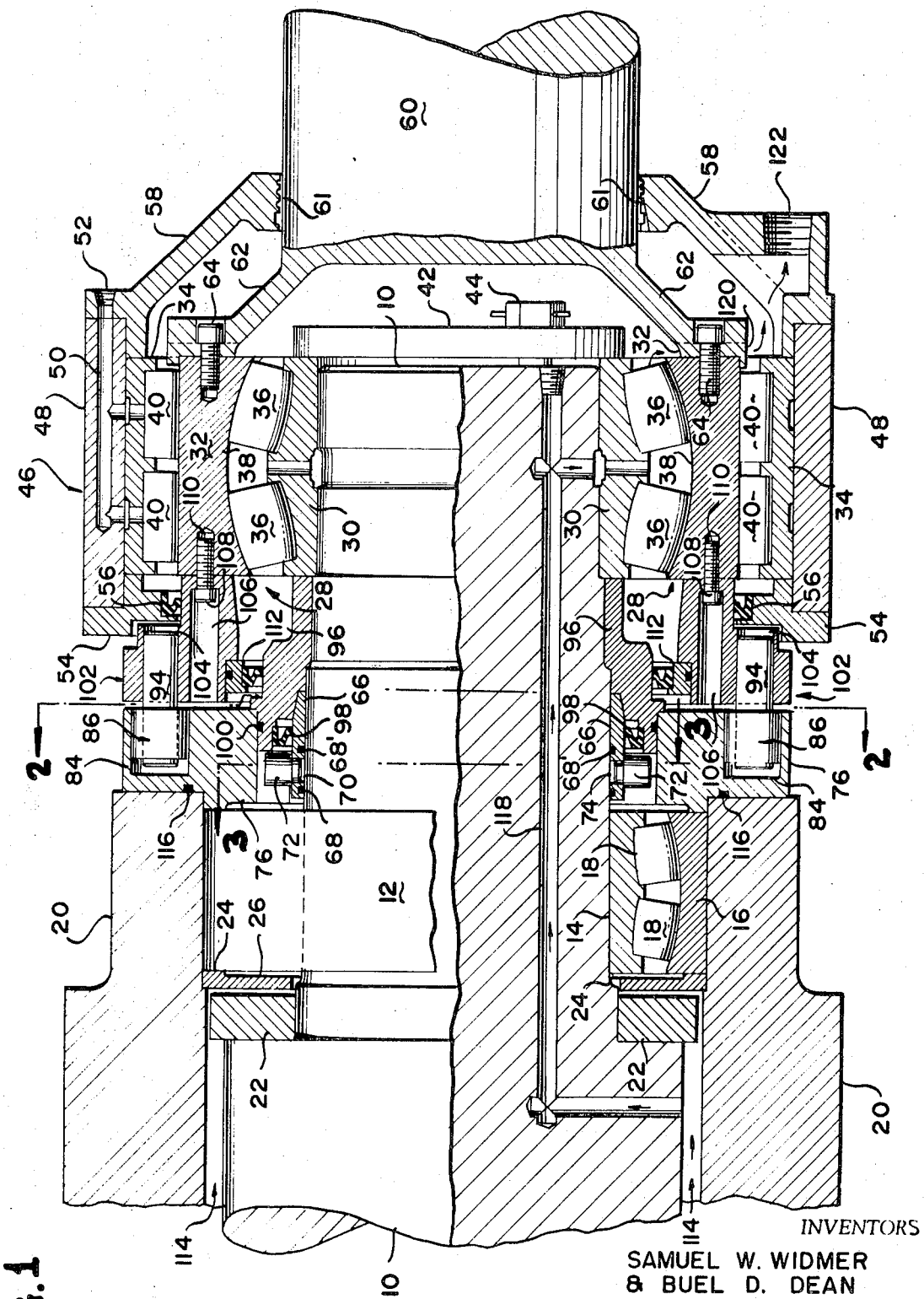

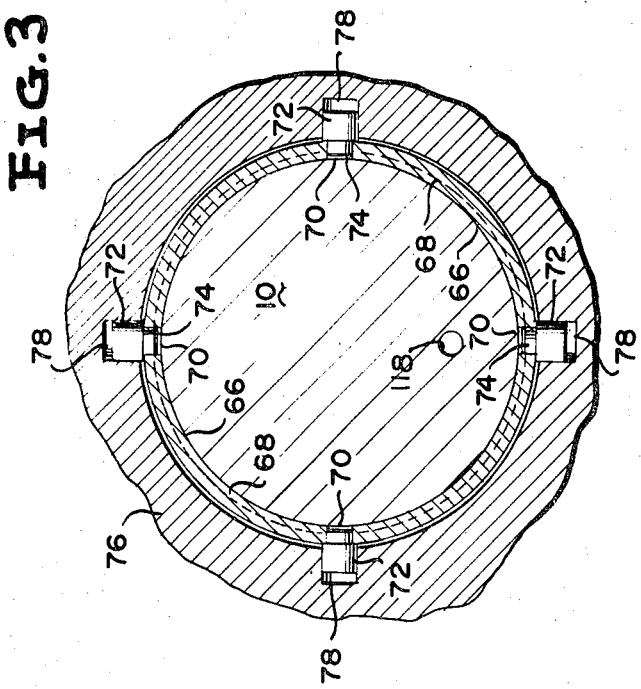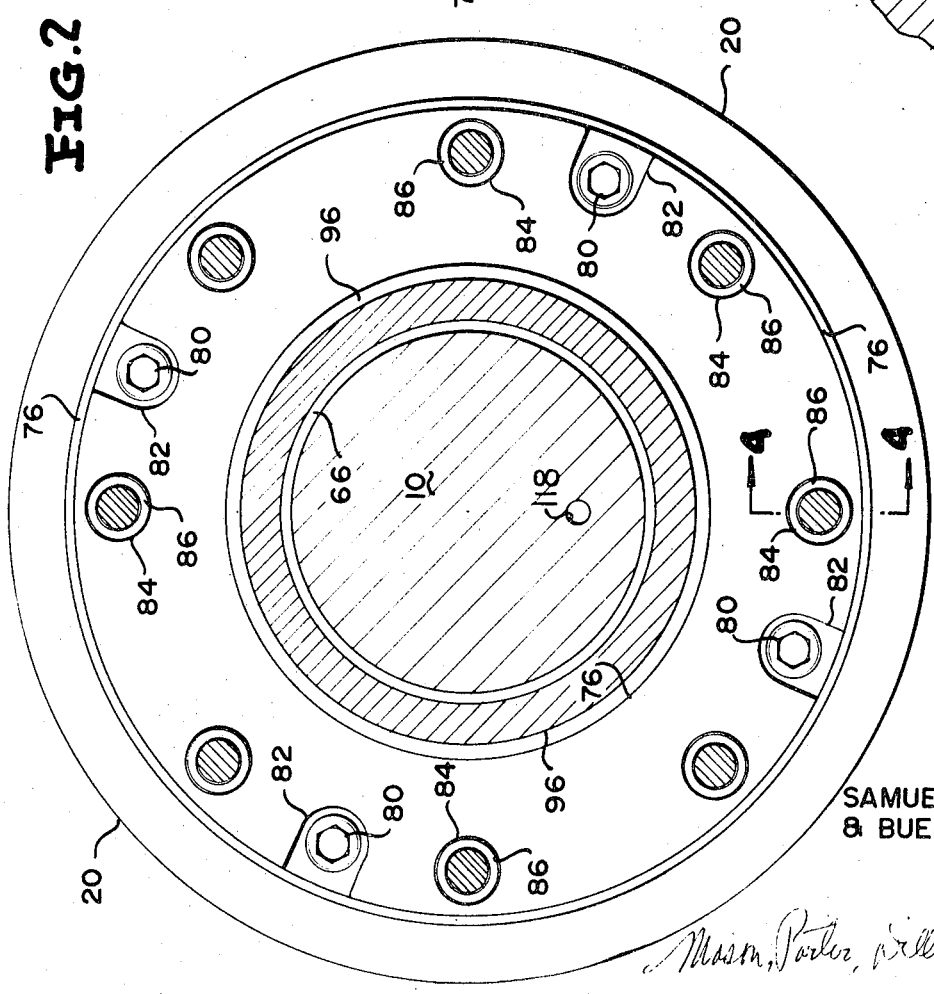

3,562,882
ROLL DRIVE THROUGH INTERMEDIATE RACE
RING OF CONCENTRIC BEARING
Samuel W. Widmer, South Bend, Ind., and Buel D. Dean,
Litchfield, Conn., assignors, by mesne assignments, to
The Torrington Company, Torrington, Conn., a corporation of Delaware
Filed June 4, 1965, Ser. No. 461,309
Int. Cl. B21b 13/02
U.S. Cl. 29—115                                    10 Claims

ABSTRACT OF THE DISCLOSURE

This disclosure relates to the mounting and driving of a roll which is subject of high pressures. The roll is rotatably mounted on a fixed shaft which, in turn, is supported by a triple race bearing with the intermediate race thereof forming a drive coupling between the roll and a drive member. The triple race bearing mounts the shaft for limited flexing under pressure.

---

This invention relates to an apparatus for driving a roll and more specifically to a roll which is driven by the intermediate race of a concentric triple race bearing. The invention is particularly useful in driving a swimming roll utilized in paper making machinery.

A swimming roll may be defined as a type of roll wherein the deflection of the roll is controlled and may be varied as desired. In other words, a roll of this type may be maintained as a true cylinder even though a force may be applied to the roll to distort it by inducing a crown or camber in the roll. Rolls, particularly calender rolls, tend to sag and hence must be crowned. The amount of crowning generally varies from one thousandths of an inch to several thousandths of an inch, the amount of crowning depending upon the position of the roll in the stack of rolls. If the top or bottom rolls are incorrectly crowned, the nip pressures in the stack will be non-uniform across the face, and no amount of crowning in the intermediate rolls will correct it. It has been pointed out that slip results between any pair of rolls which do not have crowns proportional to their diameters, and since the slip is different across the face of the rolls, a non-uniform finish is produced on the product, such as paper, being advanced by the rolls.

In order to overcome many difficulties inherent in transporting stock, such as paper stock, at high speed, the practice has developed of advancing the stock about a rotating roll or shaft which is positioned about a fixed shaft. The advantage of operating a rotating roll on a fixed shaft is that any deflection caused by the load is carried by the fixed shaft rather than the operating face of the roll. In addition, this arrangement permits circulating oil to be introduced into the area between the outside surface of the fixed shaft and the inside surface of the rotating roll. In this manner, the crown of the roll may be varied according to the pressure maintained upon the oil or hydraulic fluid retained or circulated within the area just described or, better still, the roll may be maintained as a true cylinder, without deflection or distortion.

From the foregoing, it will be apparent that difficulties will arise in transferring the rotary motion of an input shaft in order to rotate a roll about a fixed shaft. In order that the transfer of energy be truly successful, then the means must be compact, efficient, substantially immune to wear, simple and reliable in operation.

In addition, problems of alignment arise in that very long rolls (some up to perhaps 30 feet in length) must be driven at high speeds. It has been found that a triple race bearing wherein the input shaft and output roll are coupled through the intermediate race of the bearing has proved highly successful. The bearing provides not only elements which are in stationary engagement with the stationary shaft and housing but also an intermediate element or race through which the rotary energy is transferred from an input shaft to a resiliently coupled roll.

Accordingly, it is the principal object of the present invention to improve means for driving rolls.

It is a further object of the present invention to improve drive means for rolls of the type rotating about a stationary shaft.

It is a further object of the present invention to provide a compact and efficient drive means for rotating a roll at high speed about a stationary shaft.

It is a further object of the present invention to provide a drive means including a triple race bearing for coupling an input shaft to an output roll positioned about a stationary shaft.

It is a further object of the present invention to provide a drive means including a triple race bearing for coupling an input shaft to an output roll positioned about a stationary shaft, the intermediate race of the bearing serving to couple the input shaft to the output roll.

It is a further object of the present invention to provide a drive means including a triple race bearing for coupling an input shaft to the intermediate race of the bearing, the intermediate race being resiliently coupled through annular members to a roll positioned for rotation about a stationary shaft, the inner race of the bearing being supported by the shaft while the outer race of the bearing is supported by a stationary housing.

It is a still further object of the present invention to provide a drive means including a triple race bearing for coupling an input shaft to an output roll positioned about a stationary shaft, the coupling being through the intermediate race of the bearing, the inner surface of the intermediate race and outer surface of the inner race being adapted to receive spherical roller elements while the outer surface of the intermediate race and the inner surface of the outer race are adapted to receive cylindrical roller elements.

These and other objects of the present invention are accomplished by positioning a triple race bearing about a stationary shaft whereon the inner race of the bearing is supported by the stationary shaft. The outer roll to be rotated is positioned over the fixed shaft and mounted upon suitable conventional bearings. In the area between the end of the roll and the triple race bearing, a ring is secured to the intermediate race of the bearing while a collar is secured to the end of the roll. Mating apertures are formed in the ring and the collar which are adapted to receive pins which are supported in either the ring or the collar by small bushings of an elastomeric material surrounded by a metal casing. In this manner, a resilient coupling which provides for a certain amount of misalignment is accomplished between the ring and the collar or more broadly, between the intermediate race and the roll to be driven. Thereafter, a shaft to which suitable rotary motion is applied, is secured to the intermediate race so that as rotary motion is applied to the shaft, the roll will rotate in accordance therewith. The stationary shaft retains its position at all times. The outer race of the triple race bearing is supported by an external housing.

Suitable seals are employed in the practice of the invention so that a desired pressure may be maintained between the outer surface of the stationary shaft and the inner surface of the rotating roll. In addition, suitable passages are provided for lubrication of the bearing elements.

The invention as to its organization of operation together with further objects and advantages thereof will best be understood by reference to the following specification taken in conjunction with the accompanying drawings in which:

FIG. 1 is a fragmentary sectional view in partial side elevation and illustrating the triple race bearing about the stationary shaft to which is coupled, a movable shaft to drive the intermediate race of the bearing and thereby rotate the roll;

FIG. 2 is a sectional view taken along the line 2—2 of the FIG. 1 and illustrating the collar in which are positioned a plurality of resiliently loaded pins which engage a ring coupled to the intermediate race;

FIG. 3 is a sectional view taken along the line 3—3 of the FIG. 1 and illustrating the engagement of a plurality of pins with the collar and a ring in engagement with the stationary shaft; and FIG. 4 is a sectional view taken along the line 4—4 of the FIG. 2 and illustrating the resilient mounting of the pins coupling the ring secured to the intermediate race to the collar.

With reference to FIG. 1, the fragmentary sectional view in partial side elevation succinctly illustrates the novel features of the invention. A stationary shaft 10 supports a bearing 12 having an inner race 14, and an outer race 16 between which are positioned the roller elements 18. The outer race 16 of the bearing 12 is in engagement with a roll 20 to which rotary motion is applied by elements to be hereinafter described. Suffice it to say at this point, when the roll 20, which is in the form of a hollow cylinder, is rotated, the outer race 16 of the bearing 12 rotates with respect to the inner race 14 through the roller elements 18.

An annulus 22 is positioned about a reduced diameter section of the stationary shaft 10. In addition, a ring 24 is also positioned about the stationary shaft 10 at the reduced diameter portion. The ring 24 has a recess 26 opposing the bearing 12. In addition, the diameter of the ring 24 is sufficient so that its periphery engages the inner surface of the roll 20.

The roll 20 may be a type of roll known as a king roll, a swimming roll, or any one of the calender or sizing rolls used in the paper making industry. In addition, the invention has many other applications outside the paper making industry and such recitation is given only by way of example. The roll 20 may very well be a shaft which drives another member, or may take any number of forms as found convenient or expedient. It will be understood that the shaft 10 and the roll 20 would be supported at their leftmost and (not shown) by any convenient arrangement of bearings, such as the bearing 12, housings, etc.

With continued reference to the FIG. 1, and more specifically to a triple race bearing indicated generally at 28, the bearing includes an inner race 30 which is stationary and positioned about the shaft 10, a movable intermediate race 32, and a stationary outer race 34. Positioned between the inner race 30 and the intermediate race 32 are the spherical roller elements 36 which are adapted to be received in annular race surfaces formed in the outer surface of the inner race 30, the race surfaces opening concavely radially outwardly of the axis, the left row of bearing elements 36 being inclined oppositely toward the race axis from the right row of bearing elements 36.

The bearing elements 36 are positioned within the inner race 30 so as to present retaining flanges, as shown. In order that the inner surface of the intermediate race 32 be compatible with the roller elements 36, the surface 38 is an annular inner race surface opening concavely toward the race axis and toward the race surfaces engaged by the opposite sides of the roller elements 36. Thus, the surface 38 is part spherical, the arc of its concavity being struck from the center of the shaft 10 centrally of the ends of the intermediate race 32. The outer surface of the intermediate race 32 is a cylindrical race surface adapted to engage a plurality of radial roller elements 40. The inner surface of the outer race 34 is an annular cylindrical race surface which defines a generally U-shaped groove in cross section configuration and opening toward the cylindrical race surface of the intermediate race 32. In this manner, the roller elements 40 are recessed into the outer race 34 so as to provide roller element retaining flanges, as shown. Although the roller elements 36 have been described as spherical and the roller elements 40 as radial, it will be readily understood that the roller elements 36 and 40 may take other forms such as ball or spherical, etc.

A circular plate 42 is secured to the end of the stationary shaft 10 by a plurality of bolts or other securing means, one of the bolts being shown at 44, and serves to position the inner race 30 upon the shaft 10 through its engagement with the inner race 30.

A housing indicated generally at 46 surrounds the triple race bearing and has an annulus 48 in engagement with the outer surface of the outer race 34. A passageway 50 is formed in the annulus 48 so as to permit a fluid lubricant to enter via the inlet 52 and thereby cool and lubricate the roller elements 40. In addition, a ring 54 is positioned against the leftmost end of the annulus 48 and as shown, has a portion which surrounds the left end of the annulus 48 and engages the side of the outer race 34. A seal 56 is formed in the inner diameter of the ring 54 and serves to effect a seal for a purpose that will later become apparent.

The housing 46 has an end extension 58 which surrounds the right end of the annulus 48 and continues on and engages the right end of the outer race 34. The extension 58 may be secured to the annulus 48 in any suitable manner. In addition, the extension 58 terminates in a circular portion which surrounds a drive shaft 60, the engagement being provided at 61 by either a close clearance seal or by other types of seals as found convenient.

In the present invention, rotary input power is supplied to the intermediate race 32 and this energy is coupled through the intermediate race 32 and through intervening elements, to the roll 20. The input coupling through the intermediate race 32 is from the shaft 60 which has a connecting flange 62 extending therefrom and which is secured to the right side of the intermediate race 32 by any suitable means, such as a plurality of bolts 64, two of which are shown. Suitable apertures are formed in the connecting flange 62 while the intermediate race 32 is tapped as appropriate, so that the bolts 64 may be inserted through the connecting flange 62 and threaded into the intermediate race 32. As the shaft 60 is rotated, the rotation will be transferred to the intermediate race 32 and through the cooperation of the roller elements 36 and 40, the intermediate race 32 is free to rotate.

A sleeve 66 surrounds the stationary shaft 10 at a reduced diameter and has formed upon its inner surface, a pair of recesses into which seals, such as O-rings 68 and 68', are positioned in sliding engagement with the shaft 10, since the sleeve 66 is adapted for rotation, the manner of rotation to be hereinafter described.

The construction of the sleeve 66 may be better understood with simultaneous reference to the FIG. 3 and the FIG. 1. The sleeve 66 surrounding the stationary shaft 10 has a plurality of apertures 70 formed therein and directed toward the sleeve axis. The number of apertures 70 may be any number as desired or found expedient; however, in the embodiment shown in the present invention four such apertures are formed, each of which receives a pin 72 having a reduced portion 74, the reduced portion 74 actually entering the apertures 70. A collar 76 having an inside diameter slightly larger than the outside diameter of the sleeve 66 surrounds the sleeve 66 and has formed therein a plurality of slots 78 so positioned so as to receive the enlarged portion of the pins 72. As the collar 76 is rotated through means to be hereinafter described, the pins 72, by their engagement with the sleeve 66, cause the sleeve 66 to rotate about the stationary shaft 10. The O-rings 68 and 68' effect a seal between any lubricant supplied to the bearing 12 and the area to the right of the sleeve 66, as viewed in the FIG. 1.

The collar 76 of the FIG. 1 is seated against the end of the roll 20 and is bolted thereto by any suitable means such as the bolts 80 shown in the FIG. 2. A plurality of recesses 82 are formed in the face of the collar 76 so as to receive the bolts 80 and thereby position their heads below the plane of the collar 76. The bolts 80 and their corresponding recesses 82 are not shown in the FIG. 1 but are clearly illustrated in the FIG. 2. Four such bolts 80 and recesses 82 are illustrated although it will be understood that more or less may be employed in the practice of the invention.

With continued reference to the FIGS. 1 and 2, it will be observed that a plurality of apertures 84 are formed longitudinally and parallel to the longitudinal axis of the collar 76 and into the collar 76 to a distance substantially more than one-half the thickness of the collar 76. For the purposes of illustration, eight such apertures 84 have been formed. Into each of the apertures 84 is positioned a cylindrical device 86 which is illustrated in detail in the FIG. 4. The cylindrical device 86 includes an elastomeric bushing or sleeve 88 which is surrounded by a metal cylinder 90 and a smaller cylinder 92 about which the bushing 88 is positioned. A pin 94 is positioned within the cylindrical device 86 and it will be noted, by this arrangement, that a resilient coupling is effected between the collar 76 and the pin 94. Such a coupling may compensate for a limited amount of misalignment between the driving and driven members to be discussed with reference to the FIG. 1.

As illustrated in the FIG. 1, a ring 96 having an incrementally increasing inner diameter and an incrementally increasing outer diameter has a portion positioned about the stationary shaft 10 with its rightmost end in engagement with the leftmost end of the inner race 30. The inner diameter of the ring 96 is flared leftwardly so that a portion of the ring 96 overlaps the sleeve 66. At the point outwardly of and to the right of the O-ring 68', the ring 96 is stepped so as to receive a sealing member 98 for effecting a seal between the sleeve 66 and the ring 96. The ring is annularly recessed to receive a sealing member 100, generally indicated as an O-ring. The O-ring 100 effects a seal between the collar 76 and the ring 96 at the point of engagement of the O-ring 100. As shown in the FIG. 2, which is a sectional view taken along the line 2—2 of the FIG. 1, the ring 96 is shown and illustrates the portion of the ring 96 which overlaps the sleeve 66.

As shown in the FIG. 1, a ring 102 having an inner diameter somewhat larger than the outer diameter of the ring 96, surrounds a portion of the ring 96 and bears a plurality of apertures 104 which are in alignment with the apertures 84 of the collar 76 so as to receive an end of each of the pins 94. In addition, a plurality of apertures 106 are bored from the left side of the ring 102 and receive a plurality of bolts 108, a bolt per aperture, which extend into tapped apertures 110 in the intermediate race 32. In this manner, the ring 102 is secured to the intermediate race 32 so as to receive rotary motion therefrom. A sealing device 112 is positioned about a portion of the ring 96 and is carried by a portion of the inner circumference of the ring 102 so that through the cooperation of the inner sealing member and the outer O-ring, a seal is effected between the rings 96 and 102.

Assuming that the stationary shaft 10 and the movable roll 20 are supported at their leftmost end (not shown) in a manner similar to that shown about the bearing 12, a pressure may be maintained at 114 which is the area between the outer circumference of the fixed shaft 10 and the inner circumference of the movable roll 20. When loads are applied to the roll 20 so as to distort the roll 20 from a true cylinder, the area 114 may be filled with a fluid, such as hydraulic or a lubricating fluid, so as to offset the distortion and thereby return the roll 20 to the form of a true cylinder. As shown in the lower left portion of the FIG. 1, the oil will enter the cavities about the roller elements 18 so as to provide lubrication between the roller elements 18 and their races 14 and 16. An O-ring seal 116 is positioned against the end of the roll 20 and in a notch formed in the face of the collar 76. In addition, the oil is conducted by a passageway 118 from the area 114 to the chamber between the roller elements 36 of the triple race bearing and in this manner provides lubrication for the bearing elements 36, the inner race 30 and the intermediate race 38. The oil follows the path indicated by the arrows and is discharged through one or more apertures 120 formed in the connecting flange 62 and through an oil outlet 122 positioned near the lowermost point of the housing block 58. The rate at which the oil flows through the passageway 118 may be regulated by the insertion of a valve, not shown, in the oil outlet 122. The roller elements 40 and their respective races are lubricated through the oil inlet 52, as previously set forth. The seals shown and previously described, will effect a sealing action between their respective components and rings so as to maintain the desired pressures within the system.

There has been described, an apparatus wherein the intermediate race of a triple race bearing may be employed to drive a roll positioned about a stationary shaft. As the shaft 60 is rotated, the intermediate race 32 will also move and have a rate equal to the revolutions per unit time of the shaft 60. This motion is transferred to the ring 102 which is secured to the intermediate race 32 by the bolts 108. The pins 94 resting within their respective apertures 104, will drive the collar 76 which is secured to the roll 20. A salient feature of the invention is the cylindrical devices 86 positioned within each of the apertures 84 in the collar 76. The elastomeric bushing 88, which may be of rubber, absorbs a certain amount of sudden acceleration as well as compensating for slight misalignment of the ring 102 with the ring 76.

Thus, the present invention may be embodied in other specific forms without departing from the spirit and the essential characteristics of the invention. For example, although the invention has been shown as driving a roll 20, it is envisioned that other apparatus may be successfully employed and driven in the practice of the invention. Further, it is readily understood that the specific construction of the roller elements shown in the drawings is illustrative and other forms may be successfully employed. In addition, the resilient coupling of the driving elements to the driven elements may be modified and repositioned and still come within the teaching of the invention. The present embodiment is, therefore, to be considered in all respects as illustrative and the scope of the invention as being indicated by the appended claims rather than the foregoing description, and all changes which come within the meaning and range of the equivalency of the claims are, therefore, intended to be embraced therein.

What is claimed is:

1. A triple race bearing comprising three concentric transversely aligned races including an inner race, an intermediate race and an outer race; and rolling bearing elements positioned between said outer race and said intermediate race, and between said intermediate race and said inner race; said intermediate race being in the form of a one-piece elongated sleeve having inner and outer surface portions contoured to define inner and outer intermediate race surfaces and connecting means at the opposite ends of said sleeve for coupling said sleeve to and between drive and driven members.

2. The triple race bearing of claim 1 wherein said rolling bearing elements are arranged in two rows between each pair of adjacent races.

3. The triple race bearing of claim 1 wherein said inner intermediate race surface is part spherical whereby limited axial pivoting of said inner race is facilitated.

4. The triple race bearing of claim 1 wherein said inner intermediate race surface is part spherical and said rolling bearing elements between said intermediate race and said inner race are arranged in two rows and are in the form of spherical rollers whereby limited axial pivoting of said inner race is facilitated.

5. In the combination of a housing member, a supporting shaft, a roll and a drive member, a triple race bearing assembly comprising an outer race carried by said housing, an inner race supported on said shaft, an intermediate race disposed in spaced concentric transversely aligned relation to said inner and outer races, said intermediate race being in the form of a one-piece elongated sleeve have inner and outer surface portions contoured to define inner and outer race surfaces, rolling bearing elements between said outer and intermediate races and between said intermediate and inner races, and means securing said sleeve to said roll and said drive member for driving said roll from said drive member through said sleeve.

6. The combination of claim 5 wherein said supporting shaft is fixed against rotation and said roll is supported on said shaft independently of said sleeve for rotation.

7. The combination of claim 5 wherein said supporting shaft is fixed against rotation and said roll is supported on said shaft independently of said sleeve for rotation, and said inner intermediate race surface is part spherical whereby limited deflection of said supporting shaft is facilitated.

8. The combination of claim 5 wherein said supporting shaft is fixed against rotation and said roll is supported on said shaft independently of said sleeve for rotation, and said inner intermediate race surface is part spherical and said rolling bearing elements between said intermediate race and said inner race are arranged in two rows and are in the form of spherical rollers whereby limited deflection of said supporting shaft is facilitated.

9. In combination, a shaft, a roll rotatably mounted at either end thereof on said shaft, the ends of said shaft extending beyond said roll, drive means at an end of said shaft comprising a rotatable drive shaft, a housing members, bearing means rotatably supporting said drive shaft within said housing member, said bearing means comprising a coaxial three race assembly having bearing elements between the outer and intermediate races and between the inner and intermediate races, said outer race being non-rotatably carried within said housing member, said inner race being non-rotatably mounted on said end of said shaft, said drive shaft being connected to said intermediate race, and a sleeve-like coupling member disposed about said shaft and interconnecting said intermediate race and said roll.

10. In combination, a shaft, a roll rotatably mounted at either end thereof on said shaft, the ends of said shaft extending beyond said roll, drive means at an end of said shaft comprising a rotatable drive shaft, a housing member, bearing means rotatably supporting said drive shaft within said housing member, said bearing means comprising a coaxial three race assembly having bearing elements between the outer and intermediate race and between the inner and intermediate race, said outer race being non-rotatably carried within said housing member, said inner race being non-rotatably mounted on said end of said shaft, said drive shaft being connected to said intermediate race, a sleeve-like coupling member disposed about said shaft and interconnecting said intermediate race and said roll, the inner periphery of said intermediate race and the bearing seats on said inner race being defined in cross-section by the arc of a radius and the bearing elements therebetween having corresponding surface contours.

References Cited

UNITED STATES PATENTS

| | | | |
|---|---|---|---|
| 2,822,225 | 2/1958 | Teufel | 308—183 |
| 1,638,796 | 8/1927 | Cares et al. | 64—11X |
| 1,799,775 | 4/1931 | Berry | 100—162X |
| 2,727,369 | 12/1955 | Fawick | 64—11 |
| 2,939,300 | 6/1960 | Lucia | 64—10X |
| 3,037,557 | 6/1962 | Faeber et al. | 162—370 |
| 3,276,102 | 10/1966 | Justus | 100—170 |
| 3,286,325 | 11/1966 | Justus | 100—170X |
| 3,290,897 | 12/1966 | Kuehn | 64—9 |

FOREIGN PATENTS

| | | | |
|---|---|---|---|
| 1,403,210 | 5/1965 | France | 29—116 |

BILLY J. WILHITE, Primary Examiner

U.S. Cl. X.R.

29—116; 64—11; 100—162, 172; 308—183